UNITED STATES PATENT OFFICE.

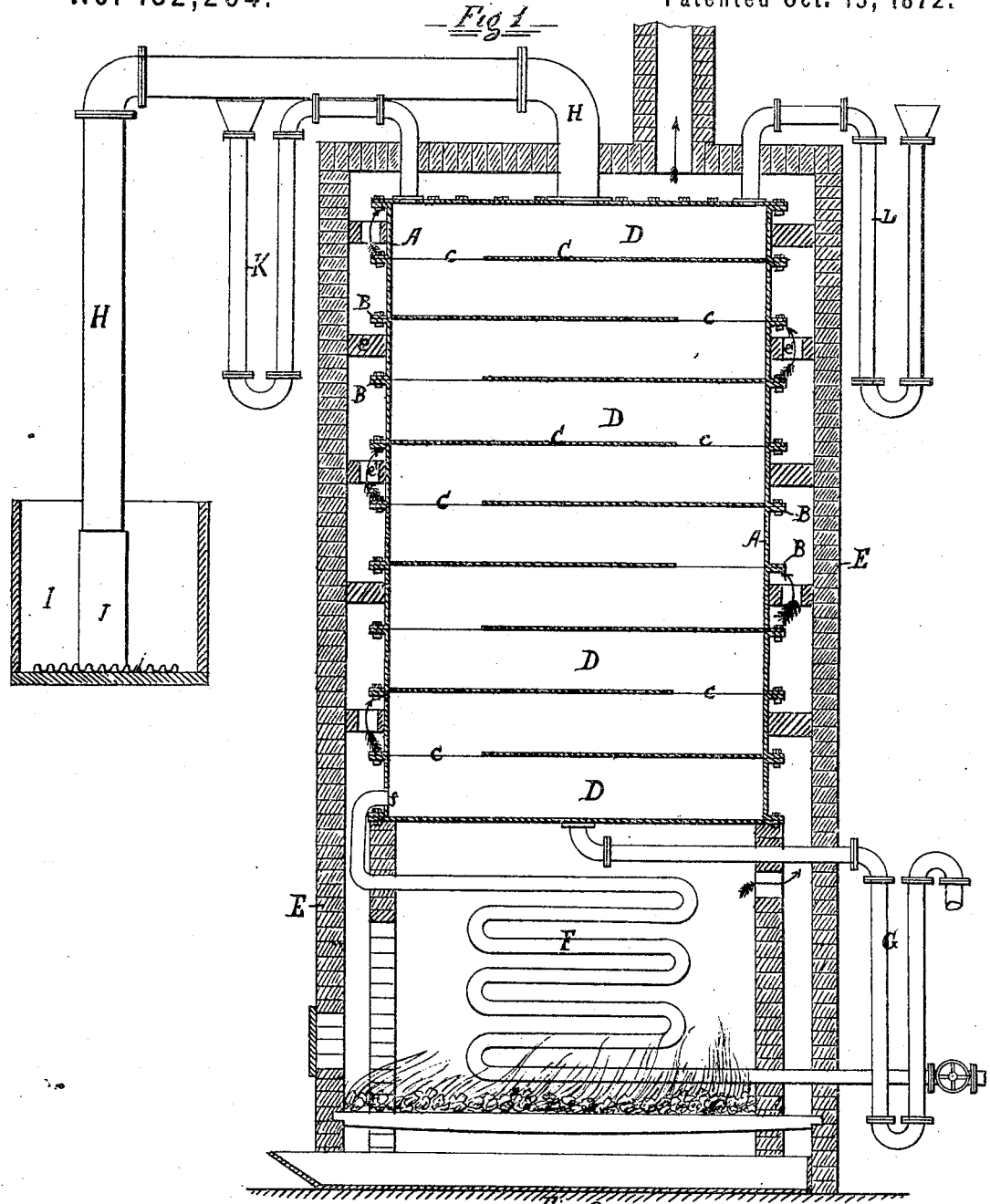

HENRY H. EAMES, OF PHILADELPHIA, PENNSYLVANIA, AND CHARLES J. EAMES, OF NEW YORK, N. Y.

IMPROVEMENT IN TREATING AMMONIACAL LIQUORS OF GAS-WORKS, &c.

Specification forming part of Letters Patent No. 132,264, dated October 15, 1872.

*To all whom it may concern:*

Be it known that we, HENRY H. EAMES, of Philadelphia, Pennsylvania, and CHARLES J. EAMES, of New York, in the county of New York and in the State of New York, have invented a certain new and useful Improvement in Treating Ammoniacal Liquors.

The nature of our invention consists in the construction of an apparatus that will completely eliminate the whole of the ammonia contained in the aqueous matter obtained from the destructive distillation of coal and other substances. The object of our invention is to obtain, in a form of vapor, the whole of the ammonia and ammoniacal salts contained in the liquor by submitting thin stratums of the liquor to the action of superheated steam with lime-water, and passing the vapor through a stratum of sulphuric acid, thereby, by chemical action, forming sulphate of ammonia. The action of the apparatus is continuous.

It is well known that, in operating upon large quantities of liquids containing volatile substances, in order to eliminate such substances by the process of vaporization, it is possible to more completely and rapidly eliminate the volatile substances by acting successively upon small portions of the mass of liquid rather than by acting directly upon the entire mass; and our invention is calculated to thus facilitate the operation just referred to.

Figure 1 is a vertical section of an apparatus embodying our invention. Fig. 2 is a detail view of a part of the same.

A are cylinders of suitable metal, which may be of oblong or other desirable form than circular, as shown in the drawing, and are provided with flanges B, by which they may be securely bolted together, one above the other, and made air-tight by cement packing, this series of cylinders forming our vaporizing-chamber. Each cylinder A is provided with a diaphragm, C, and these diaphragms C divide the vaporizing-chamber into compartments D, that are two inches (more or less) in height, an opening, c, in each of the diaphragms C serving to connect the compartments D. Our vaporizing-chamber is conveniently and securely set within a furnace; and between the walls of the furnace E and the vaporizing-chamber we place divisions e provided with openings e' so arranged that the heat of the furnace will be forced to follow the course of the arrows shown in the drawing and slowly wind around the vaporizing-chamber and out of the top of the furnace, thereby utilizing the whole of the heat. F is a coil for superheating the steam that passes through the inlet of the vaporizing-chamber at f. The employment of superheated steam is not essential at all times to aid the furnace in vaporizing the volatile substances in the mass of liquid to be treated. The siphon G at the bottom of the vaporizing-chamber furnishes the means of exit for the liquids freed from the volatile substances once contained therein, but which have been vaporized and passed off through the vapor-eduction pipe H and held by chemical action in passing through the stratum of sulphuric acid contained in the saturator I. K is the siphon by which a continuous flow of lime-water is introduced into the upper compartment D; and L is a similar siphon for supplying said compartment D with a steady flow of the mass of liquid to be operated upon, the two bodies of liquids intermingling and flowing through the upper compartment D over its diaphragm B into the compartment next below by way of the opening c. We find that the ammoniacal liquor usually furnished by gas-works contains variable quantities of ammonia and its salts, (or carbonates,) and the quantity of lime and water must be proportioned accordingly; but we find on an average that about one gallon of the milk of lime to about twenty gallons of the ammoniacal liquor are the usual practical working proportions. The saturator I is a tank lined with lead about half filled with sulphuric acid, into which projects the iron eduction-pipe H that terminates in the saturator I with a joint of lead pipe, J, terminating in a corrugated lead plate, j, to diffuse the vapor through the sulphuric acid.

The construction of our invention having been described, we now describe its operation. Before the treatment begins we see that the sulphuric acid is in the saturator I. Fire is then started in the furnace, the vapor-chamber thoroughly heated to about the boiling-point of the ammoniacal liquor, and then the siphon L is filled by a continuous stream of the ammoniacal liquor, which flows thence into the upper compartment D of the vaporizing-chamber, while the siphon K is filled by a continuous stream of the lime-water, which then flows in like manner, both flowing in a continuous intermingled stream down through the series of compartments D, flowing in thin stratums over the diaphragms C and through openings c. The steam is then permitted to pass through the superheating-coil F into the lower compartment of the vaporizing-chamber, and thence through openings c in and out of the series of compartments, helping to heat the vaporizing-chamber and its contents. The ammoniacal vapors rise and pass through the pipe H and I into the sulphuric acid in the saturator I, where they are, by chemical action, converted into sulphate of ammonia, the crystals of this product forming on the surface and removed from time to time and fresh sulphuric acid added. The residuum liquor flows off as fast as it passes to the bottom of the vaporizing-chamber through the siphon G, which is at first sealed with water.

Having thus fully described our invention, what we claim as new, and desire to secure by Letters Patent, is—

1. The method herein described for treating ammoniacal liquor by subjecting it to the direct action of steam or superheated steam while flowing in a stream, substantially as set forth.

2. The apparatus herein described constructed with a vaporizing-chamber and siphons L and K, pipe H J, saturator I, and eduction-siphon G, substantially as set forth.

In testimony that we claim the above-described certain new and useful improvement in treating ammoniacal liquors we have hereunto signed our names this 10th day of September, 1872.

HENRY H. EAMES.
CHARLES J. EAMES.

Witnesses:
V. C. CLAYTON,
EDM. F. BROWN.